Feb. 19, 1957  D. E. ESCHE  2,782,068
SLEEPING DEVICE FOR MOTOR VEHICLES
Filed June 15, 1954

INVENTOR.
DELBERT E. ESCHE
BY
ATTORNEY.

United States Patent Office 2,782,068
Patented Feb. 19, 1957

2,782,068

SLEEPING DEVICE FOR MOTOR VEHICLES

Delbert E. Esche, Dearborn, Mich.

Application June 15, 1954, Serial No. 436,903

3 Claims. (Cl. 296—23)

This invention relates to a sleeping device for motor vehicles, as for example trucks, tractors, and the like.

A primary object of my invention is to provide an attachment of this kind to be carried by a wall of the vehicle and preferably a door, in such relation with respect to a seat in the vehicle as to permit a person to lie down on the seat, with his feet extending into said attachment.

Another object of my invention is to provide a collapsible hood-like structure of this kind to be carried in a door of the vehicle, which when in the closed position will occupy a minimum of space.

Still another object of my invention is to provide a box-like extension beyond the seat of a vehicle, which provides protection from the weather when a person is reclining on the extended seat of the vehicle.

There have been a variety of ways proposed for providing for sleeping in a reclining position in motor vehicles such as trucks or the like, but the only ones which have been adopted commercially thus far have been complicated and elaborate, generally requiring an increase in the length or width of the cab or vehicle, with a corresponding increase in weight. Restrictions on the allowable length of motor vehicles in the various States militate against sleeper cab constructions which increase the length of the vehicle. Also, sleeper cabs add greatly to the weight of the vehicle, generally increasing the load by about 1000 pounds. Since this load limits the payload, it is obviously a vital consideration. Truckers make every effort to reduce weight, and they are therefore very reluctant to provide any sleeping arrangement which increases the weight substantially. Besides the loss in revenue caused by the extra weight of a sleeper cab, there is also the initial expense, which averages about $1000. These factors have generally prevented the use of sleeping cabs, with the result that truckers sleep in extremely awkward and uncomfortable positions in the cab. Aside from the discomfort, this is a dangerous practice, because it is vital that truckers be thoroughly alert when driving, and that requires comfortable resting at intervals of time. The importance of proper rest to truckers is indicated by their willingness to spend $100 or so for auxiliary gasoline heaters for heating the cab when the motor is off and the trucker is sleeping in the cab. Thus, while the importance of sleeping facilities for truckers is appreciated, the solutions thus far proposed have been generally unacceptable and unaccepted.

My invention solves these problems. It accomplishes the desired result without any increase in the size of the vehicle and with no substantial weight increase, providing an extremely simple and inexpensive attachment which can readily be placed in the door of any standard motor vehicle. It is collapsible and completely self-storing, occupying no space in the interior of the motor vehicle. Its cost is less than one-tenth that of a sleeper cab construction, and it can be very easily attached to a conventional truck in only a few minutes, by replacing the original door with one prepared as described below. Another advantage of my invention is that it in no way interferes with the window mechanism in the door to which it is affixed.

Other objects and advantages of my invention will more fully appear from the following description taken in connection with the accompanying drawings, wherein is disclosed a preferred embodiment of the invention.

Figure 1:
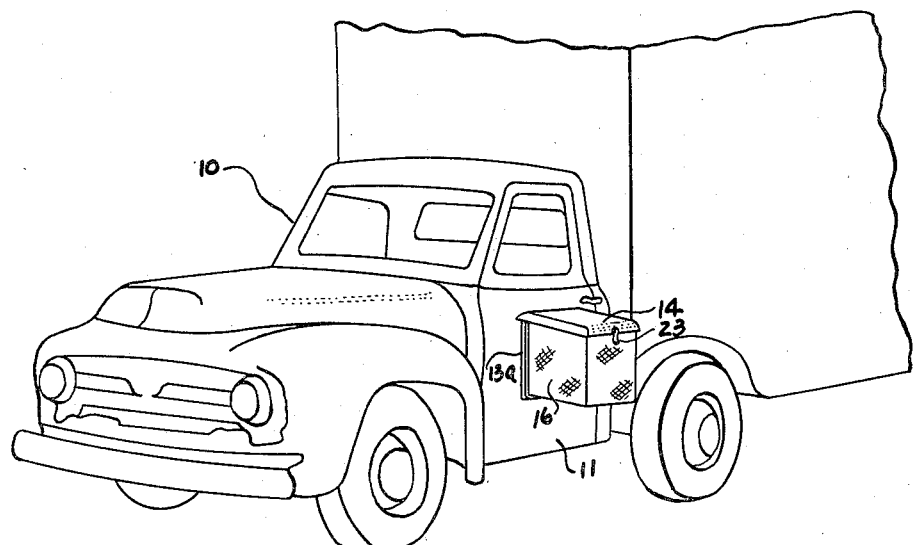
Fig. 1 is a perspective view of the invention, as used in the cab of a truck.
Figures 2, 3:
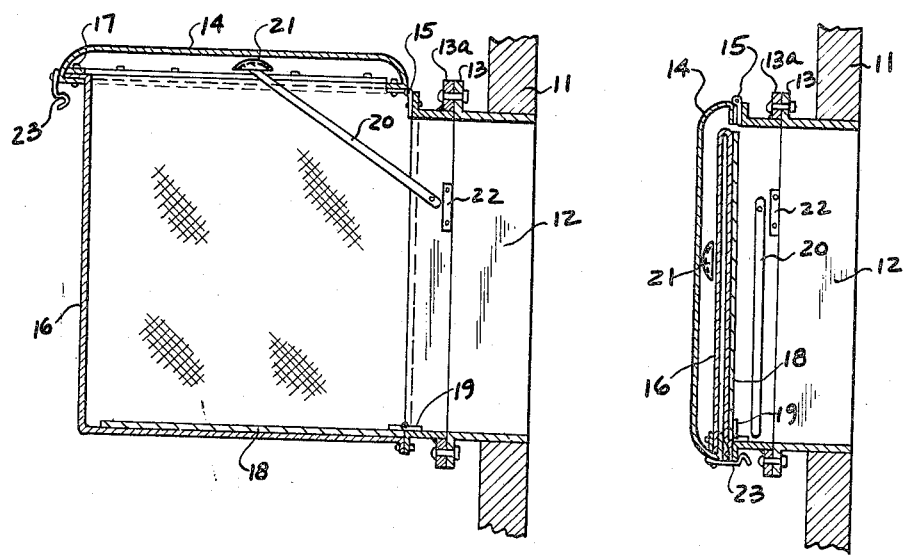
Fig. 2 is a side view of the invention in the open position, in cross-section.
Fig. 3 is a side view of the invention in the closed position in cross-section.

Referring to the drawings in detail, I have shown a cab indicated generally by the numeral 10, with a door 11 in which the attachment is mounted. An opening 12 in the door 11 is provided at a suitable position in the lower portion of the door, so that the driver can lie down on the seat, with his legs extending through said opening 12. A flanged member 13, substantially rectangular in shape, is preferably secured around the opening 12, as shown. A mating flange 13a acts as support for the collapsible hood-like structure shown. A top cover 14 is attached to the mating flange 13a by a hinge or hinges 15, so that the top cover 14 is rotatable outwardly and upwardly from the opening 12 in the door 11. In the open position, the top cover 14 is in substantially a horizontal position, forming the top of the box-like extension; in the closed position, it is substantially vertical. A flexible sheet 16, which may be of fabric or plastic, and is preferably waterproof, is fastened to the door 11 in the vicinity of the opening 12 and to the top cover 14 in a suitable way, so that when the top cover 14 is opened, the flexible sheet 16 forms the sides and bottom of a box-like structure. The top cover 14 is preferably curved as shown, so that it provides storage capacity for the folded flexible sheet 16, when in the closed position. As shown in the drawings, the flexible sheet 16 may be secured to the mating flange 13a at the sides and bottom thereof, and to the top cover 14 at its outer edges. The flexible sheet 16 may be secured as shown for example at 17, i. e. between two pieces of metal in gasket-like fashion.

A bottom plate 18 is attached to the mating flange 13a by a hinge or hinges 19, so that the bottom plate 18 is rotatable outwardly and downwardly from the opening 12 in the door 11. The bottom plate 18 serves three useful functions. Firstly, it forms a firm bottom rest for the feet when extended through the opening 12 in the door 11. Secondly, it helps to shape the flexible sheet 16 into the desired box-like form. Thirdly, in the closed position, it acts as a partition, retaining the flexible sheet 16 in the opening 12, i. e. keeping it out of the cab and out of the window mechanism (not shown in the drawings). If desired, the bottom plate 18 may, in the open position, be a few inches lower than the seat in the cab, allowing room for a pillow to be placed on the bottom plate 18.

If desired, the bottom part of the flexible sheet 16 may be secured to the underside of the bottom plate 18 instead of to the bottom of the flange 13a, or it may be left unfastened at the bottom altogether. Any other suitable means of fastening the flexible sheet 16 may also be used; however, I prefer to use the type of connection described above and shown in the diagrams.

Any suitable supporting means for the top cover 14, in the open position, may be used. A preferred means is shown in the drawings. It consists of a supporting rod 20, pivoted at one side of the mating flange 13a in the upper portion thereof, a pocket 21 fastened to the underside of the top cover 14 at a position such that it prevents the supporting rod 20 from rotating downward when in the open position, and a stop plate 22 secured to the mating flange 13a adjacent to the supporting rod 20 and so positioned as to prevent rotation of the supporting rod 20 substantially beyond the vertical position when in the closed position. If desired, the stop plate 22 may be integral with the pivot of the supporting rod 20. I prefer to use two such supporting means, one at each side of the mating flange 13a, in order to provide a more rigid support. The supporting rod 20, in turn, in the closed position acts as a stop for the bottom plate 18 and the flexible sheet 16.

Suitable clasping means 23 is preferably provided for securing the top cover 14 to the mating flange 13a when in the closed position.

Various modifications in the details of construction may be made without departing from the spirit of the invention as defined in the following claims which are directed to the principal features of the invention rather than to the readily changeable details of construction.

I claim:

1. The combination with a wall of a door of a motor vehicle body having an opening therethrough in the lower half thereof and a seat structure within the body adjacent to the opening, of a collapsible enclosure unit carried by the wall of said door on the outer side thereof and with which the opening communicates adapted to be extended beyond the side of the vehicle body to provide a box-like addition to said seat to form a bed extending transversely of the vehicle, said collapsible enclosure unit comprising: a top cover rotatably hinged at the top adapted to swing outwardly and upwardly from the opening in said door, a bottom plate rotatably hinged at the bottom adapted to swing outwardly and downwardly from the opening in said door, and a flexible sheet suitably secured to said top cover and to said door in the vicinity of the opening therethrough, said flexible sheet being of such size and shape as to form the sides and bottom of a box-like hood when said collapsible enclosure unit is opened, said bottom plate being within said box-like hood in the bottom portion thereof and shaping said flexible sheet to form said box-like hood.

2. The combination with a wall of a door of a motor vehicle body having an opening therethrough in the lower half thereof and a seat structure within the body adjacent to the opening, of a collapsible enclosure unit carried by the wall of said door on the outer side thereof and with which the opening communicates, adapted to be extended beyond the side of the vehicle body to provide a box-like addition to said seat to form a bed extending transversely of the vehicle, said collapsible enclosure unit comprising: a top cover rotatably hinged at the top adapted to swing outwardly and upwardly from the opening in said door, a bottom plate rotatably hinged at the bottom adapted to swing outwardly and downwardly from the opening in said door, a flexible sheet suitably secured to said top cover and to said door in the vicinity of the opening therethrough, and suitable supporting means for said top cover when it is in the open position, said flexible sheet being of such size and shape as to form the sides and bottom of a box-like hood when said collapsible enclosure unit is opened, said bottom plate being within said box-like hood in the bottom portion thereof and shaping said flexible sheet to form said box-like hood.

3. The combination with a wall of a door of a motor vehicle body having an opening therethrough in the lower half thereof and a seat structure within the body adjacent to the opening, of a collapsible enclosure unit carried by the wall of said door on the outer side thereof and with which the opening communicates, adapted to be extended beyond the side of the vehicle body to provide a box-like addition to said seat to form a bed extending transversely of the vehicle, said collapsible enclosure unit comprising: a substantially rectangular flanged member secured to the opening in said door at the outside thereof, a mating flange suitably fastened to said flanged member, a top cover rotatably hinged at the top portion of said mating flange and adapted to swing outwardly and upwardly from said mating flange, a bottom plate rotatably hinged at the bottom portion of said mating flange and adapted to swing outwardly and downwardly from said mating flange, a flexible sheet suitably secured to said top cover and to said mating flange, supporting means for said top cover when it is in the open position, and suitable clasping means for securing said top cover to said flange in the closed position, said flexible sheet being of such size and shape as to form the sides and bottom of a box-like hood when said collapsible enclosure unit is opened, said bottom plate being within said box-like hood in the bottom thereof and shaping said flexible sheet to form said box-like hood, the aforesaid supporting means for the top cover comprising at least one supporting rod rotatably pivoted at a side of said mating flange in the upper portion thereof, at least one pocket secured to the underside of said top cover at a position such that it prevents the corresponding supporting rod from rotating downward when it is supporting said top cover, and at least one stop plate secured to said mating flange adjacent to the corresponding supporting rod and so positioned as to prevent rotation of said supporting rod substantially beyond the vertical position when said enclosure unit is in the closed position.

References Cited in the file of this patent

UNITED STATES PATENTS

| | | |
|---|---|---|
| 1,287,925 | Eber | Dec. 17, 1918 |
| 1,542,526 | Robinson | June 16, 1925 |
| 2,174,499 | Kounkel | Sept. 26, 1939 |
| 2,506,870 | Hairston | May 9, 1950 |
| 2,661,233 | Sidel | Dec. 1, 1953 |